(12) United States Patent
Narayanaswamy

(10) Patent No.: US 6,611,358 B1
(45) Date of Patent: *Aug. 26, 2003

(54) DOCUMENT TRANSCODING SYSTEM AND METHOD FOR MOBILE STATIONS AND WIRELESS INFRASTRUCTURE EMPLOYING THE SAME

(75) Inventor: Shankar Narayanaswamy, Sunnyvale, CA (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/877,454

(22) Filed: Jun. 17, 1997

(51) Int. Cl.⁷ .................................................. H04N 1/00
(52) U.S. Cl. .................. 358/442; 358/443; 379/100.13; 345/864
(58) Field of Search .................. 358/442, 443, 358/444, 445, 434, 435, 436, 437, 438, 439, 402, 403, 407; 395/109, 200.58, 200.67, 200.76; 370/401; 455/435; 345/601, 602, 691, 696, 698, 699, 746, 788, 789, 864, 866; 379/100.09, 100.12, 100.13

(56) References Cited

U.S. PATENT DOCUMENTS

| | | | | |
|---|---|---|---|---|
| 5,166,932 A | * | 11/1992 | Hoff et al. | 370/349 |
| 5,175,684 A | * | 12/1992 | Chong | 704/3 |
| 5,223,948 A | * | 6/1993 | Sakurai et al. | 358/404 |
| 5,274,841 A | * | 12/1993 | Natarajan et al. | 370/337 |
| 5,363,090 A | * | 11/1994 | Cannon et al. | 340/825.44 |
| 5,420,692 A | * | 5/1995 | Lin et al. | 382/245 |
| 5,446,678 A | * | 8/1995 | Saltzstein et al. | 709/246 |
| 5,488,653 A | * | 1/1996 | Dimolitsas et al. | 379/100.17 |
| 5,495,344 A | * | 2/1996 | Callaway, Jr. et al. | 358/407 |
| 5,522,041 A | * | 5/1996 | Murakami et al. | 395/200.01 |
| 5,602,875 A | * | 2/1997 | Mantel et al. | 375/264 |
| 5,621,894 A | * | 4/1997 | Menezes et al. | 358/42 |
| 5,635,918 A | * | 6/1997 | Tett | 340/7.29 |
| 5,666,159 A | * | 9/1997 | Parulski et al. | 348/211 |
| 5,682,525 A | * | 10/1997 | Bouve et al. | 707/104.1 |
| 5,684,865 A | * | 11/1997 | Mohtashemi et al. | 379/100.17 |
| 5,694,580 A | * | 12/1997 | Narita et al. | 395/200.18 |
| 5,717,737 A | * | 2/1998 | Doviak et al. | 379/58 |
| 5,724,410 A | * | 3/1998 | Parvulescu et al. | 379/88.18 |
| 5,727,159 A | * | 3/1998 | Kikinis | 395/200.76 |
| 5,742,905 A | * | 4/1998 | Pepe et al. | 455/461 |
| 5,758,088 A | * | 5/1998 | Bezaire et al. | 709/232 |
| 5,793,498 A | * | 8/1998 | Scholl et al. | 358/434 |
| 5,802,465 A | * | 9/1998 | Hamalainen et al. | 455/403 |
| 5,859,594 A | * | 1/1999 | King et al. | 340/825.44 |
| 5,864,673 A | * | 1/1999 | Ohto et al. | 709/219 |
| 5,886,646 A | * | 3/1999 | Watanabe et al. | 340/825.44 |
| 5,887,249 A | * | 3/1999 | Schmid | 455/411 |
| 5,889,473 A | * | 3/1999 | Wicks | 340/825.44 |
| 5,928,325 A | * | 7/1999 | Shaughnessy et al. | 709/206 |
| 5,940,117 A | * | 8/1999 | Hassan et al. | 725/115 |
| 5,940,752 A | * | 8/1999 | Henrick | 455/419 |
| 5,946,629 A | * | 8/1999 | Sawyer et al. | 455/466 |
| 5,995,597 A | * | 11/1999 | Woltz et al. | 379/93.24 |
| 6,006,091 A | * | 12/1999 | Lupien | 455/435 |
| 6,043,849 A | * | 3/2000 | Imanaka et al. | 348/468 |
| 6,101,392 A | * | 8/2000 | Corriveau | 455/458 |

* cited by examiner

*Primary Examiner*—Madeleine Nguyen
*Assistant Examiner*—Joseph R. Pokrzywa

(57) ABSTRACT

A system and method for transcoding a document to be transmitted to a mobile station according to document display capabilities thereof and a wireless infrastructure containing the same. The system includes: (1) a station identifying circuit that receives data indicating a particular mobile station's document display capabilities and (2) a transcoding circuit that modifies the document according to the document display capabilities before the document is transmitted to the particular mobile station, the particular mobile station thereby freed of having locally to substantially modify the document according to the document display capabilities.

39 Claims, 2 Drawing Sheets

100

DOCUMENT TRANSCODING SYSTEM AND METHOD FOR MOBILE STATIONS AND WIRELESS INFRASTRUCTURE EMPLOYING THE SAME

TECHNICAL FIELD OF THE INVENTION

The present invention is directed, in general, to wireless communication and, more specifically, to a transcoding system and method that optimizes documents to be transmitted to a mobile station for display thereon and a wireless infrastructure employing the same.

BACKGROUND OF THE INVENTION

The importance of wireless communication systems today is evident by its usage in popular platforms such as mobile telephony, paging systems and portable computers. The popularity of wireless communication systems is, in part, a result of the flexibility the system provides to the user. The user is provided instant communication on demand at any location, within certain restrictions. While conventional wireless communication systems provide both voice communication and document transmitting capabilities, the next generation systems will provide enhanced communication services such as electronic mail and full multimedia communication. The expanded capabilities will further enhance the user document accessing and retrieval capabilities.

With regard to the document handling capabilities, documents are stored in various formats depending on the creator, the maintainer or distributor of the document. Mobile stations (especially wireless stations), however, are generally unable to interpret all formats. Due to the compactness and relative simplicity of the design, the mobile stations are not equipped with the hardware or computational power to accommodate multi-format document interpretation. Thus, the mobile stations only recognize a limited number of document formats thereby effectively limiting the document handling capability thereof.

Another problem encountered when transmitting information to mobile stations is the relatively low communication bandwidth associated with the mobile station. Documents in formats that are not supported by the mobile station (e.g., documents that include both text and graphics to a station that supports text-only documents) may require additional bandwidth. Obviously, the use of the excess bandwidth is an inefficient use of bandwidth if the mobile station is unable to recognize a substantial portion of the document. As the congestion in the wireless communication systems continues to increase, the multi-formatted documents will place undue burdens on the available bandwidth of the system (if the station cannot recognize the document) thereby resulting in a slower overall system response time.

With regard to the content of the documents, the document may be formatted for certain graphics display systems such as video graphics array ("VGA") or super video graphics array ("SVGA"). If the mobile station has graphics capability, the screens associated therewith tend to be very small and monochrome. For instance, a VGA system in text mode provides a resolution of about 720 by 400 pixels; in the graphics mode, the resolution of the VGA system is about 640 by 480 pixels (with 16 colors) or 320 by 200 pixels(with 256 colors). The display for a mobile station (such as a pager) only provides a resolution of about 80 by 25 pixels. Thus, transmitting data to a station without considering the station's display capabilities and screen resolution is an inefficient use of the limited bandwidth available for the wireless communication systems.

Currently, documents are transmitted in wireless communication systems without regard to the capabilities of the mobile stations. Thus, to recognize and, if possible, process documents in different formats, the mobile station must be equipped with additional hardware and software to perform the necessary tasks. As a result, the mobile station expends more energy in an attempt to process the document. Mobile stations such as portable computers and mobile telephones are generally powered by a plurality of batteries. Obviously, the operational life of the mobile station depends on the operational life of the batteries powering the system. The operational life of the batteries is a function of its stored energy capacity and the power requirements of the device supported by the batteries. A lower stored energy capacity results in a shorter operational life-span. Similarly, the greater operational demands of the supported device reduces the operational life of the battery. When a mobile station uses more hardware and software, the power requirements necessary to adequately power and operate the mobile station are increased. Therefore, it is desirable to reduce the demands of the mobile station to ultimately reduce the demands on the power system (e.g., battery system).

Therefore, what is needed in the art is a recognition that mobile stations have varying degrees of document handling capabilities and, in conjunction therewith, a system and method of transmitting documents to a mobile station in a format that corresponds to the document handling capabilities and, in particular, the document display capabilities thereof.

SUMMARY OF THE INVENTION

To address the above-discussed deficiencies of the prior art, the present invention provides a system and method for transcoding a document to be transmitted to a mobile station according to document display capabilities thereof and a wireless infrastructure containing the same. The system includes: (1) a station identifying circuit that receives data indicating a particular mobile station's document display capabilities and (2) a transcoding circuit that modifies the document according to the document display capabilities before the document is transmitted to the particular mobile station, the particular mobile station thereby freed of having locally to substantially modify the document according to the document display capabilities.

"Transcoding" is defined for purposes of the present invention as a process of translation, transformation, modification or substitution that results in a document being changed in terms of its structure, format, length, attributes (to be defined) or temporal transmission order. "Document" is defined for purposes of the present invention as anything that can be visually displayed (such as text, a graphical image, a photograph or a video stream) and any data ancillary to that which is visually displayed (usually in the form of multimedia attachments, such as imbedded images or sounds). Those skilled in the art are aware that today's multimedia systems operate on integrated multimedia documents. The present invention is fully capable of transcoding such documents, as well as more conventional, single media documents.

The present invention therefore introduces the broad concept of modifying documents to accommodate features or limitations of the mobile stations to which they are to be transmitted before they are actually transmitted. When the documents arrive at the mobile station, they are ready to display, without requiring substantial modification. Not only does the present invention relieve the mobile station's processor of the overhead of performing such modifications, the mobile station is not required to contain the software or circuitry required to perform the modifications. The result is twofold: mobile station power is saved (allowing longer battery life) and, in cases wherein modification results in a reduction in document size, bandwidth and the time taken to transmit the document are decreased (allowing a given infrastructure to communicate more documents).

In one embodiment of the present invention, the transcoding circuit translates the document from a first display format to a second display format, the document display capabilities including a capability of displaying the document in the second display format. Today's common still image formats include: bitmap ("BMP"), Graphics Interchange Format ("GIF"), Joint Photographic Experts Group ("JPEG") and Tagged Image File Format ("TIFF"). Today's common video formats include: Motion Picture Experts Group ("MPEG") I and II and IEEE H.320. Thus, the particular mobile station may be capable of displaying a JPEG-encoded document, but not one that is GIF-encoded. Thus, the station identifying circuit determines this capability (or limitation, as the case may be); and the transcoding circuit responds by automatically transcoding GIF-encoded documents into JPEG-encoded documents. Alternatively or additionally, the transcoding circuit may scale, skew, rotate, change the aspect ratio of, or otherwise warp the document to fit the mobile station's display.

In one embodiment of the present invention, the transcoding circuit translates the document from a graphics-based format to a text-based format, the document display capabilities including only a capability of displaying the text-based format. Some mobile stations may only be text-capable. In such cases, the transcoding circuit may contain text recognition algorithms or circuitry to transcode those portions of a graphical document that contain text into the text-based equivalent. Alternatively, some mobile stations may not have character-generating capability. In such cases, the transcoding circuit transcodes text-based documents into a graphical document.

In one embodiment of the present invention, the transcoding circuit rearranges a temporal order of transmission of the document to the particular mobile station. For example, the document may contain text with embedded graphical images or sounds. Since text requires less bandwidth to transmit than graphical images or sounds, the transcoding circuit may reorder the document to have the text to be transmitted first, followed by the graphical images or sound. In this way, the user first sees the text, and is not required to wait until the ancillary data are transmitted.

In one embodiment of the present invention, the transcoding circuit modifies an attribute of the document. "Attribute" is defined for purposes of the present invention as a characteristic of the document, such as the color (or absence thereof) or the resolution of the document. If the station identifying circuit identifies the mobile station as not having color display capability, the transcoding circuit can remove the color from documents before they are transmitted to the station. If the station identifying circuit identifies the mobile station as having a low-resolution display, the document can be so-modified.

In one embodiment of the present invention, the transcoding circuit divides the document into pages. The page size and shape are preferably a function of the characteristics of the mobile station display. Such division allows a user to page through the document, even though the document, in its original format, may not have been structured to allow paging.

In one embodiment of the present invention, the document contains control codes, the transcoding circuit modifying the document according to the control codes. Therefore, documents may anticipate that they will require transcoding and include codes (such as optional page breaks) that make the transcoding process more effective or efficient. Widely-disseminated documents may benefit most from such control codes.

In one embodiment of the present invention, the station identifying circuit and the transcoding circuit are embodied in a sequence of software instructions executable in a computer system associated with a base station. Alternatively, the station identifying circuit and the transcoding circuit may be embodied in hardware or firmware and may be present in the base station itself.

In one embodiment of the present invention, the station identifying circuit receives the data from a database of predetermined document display capabilities. Thus, rather than determining the document display capabilities dynamically, the present invention may operate with a database of stored (perhaps previously-determined) capabilities.

In one embodiment of the present invention, the document display capabilities are user-determined. Thus, the user of the mobile station may select a subset of the station's true capabilities, perhaps for economic reasons.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
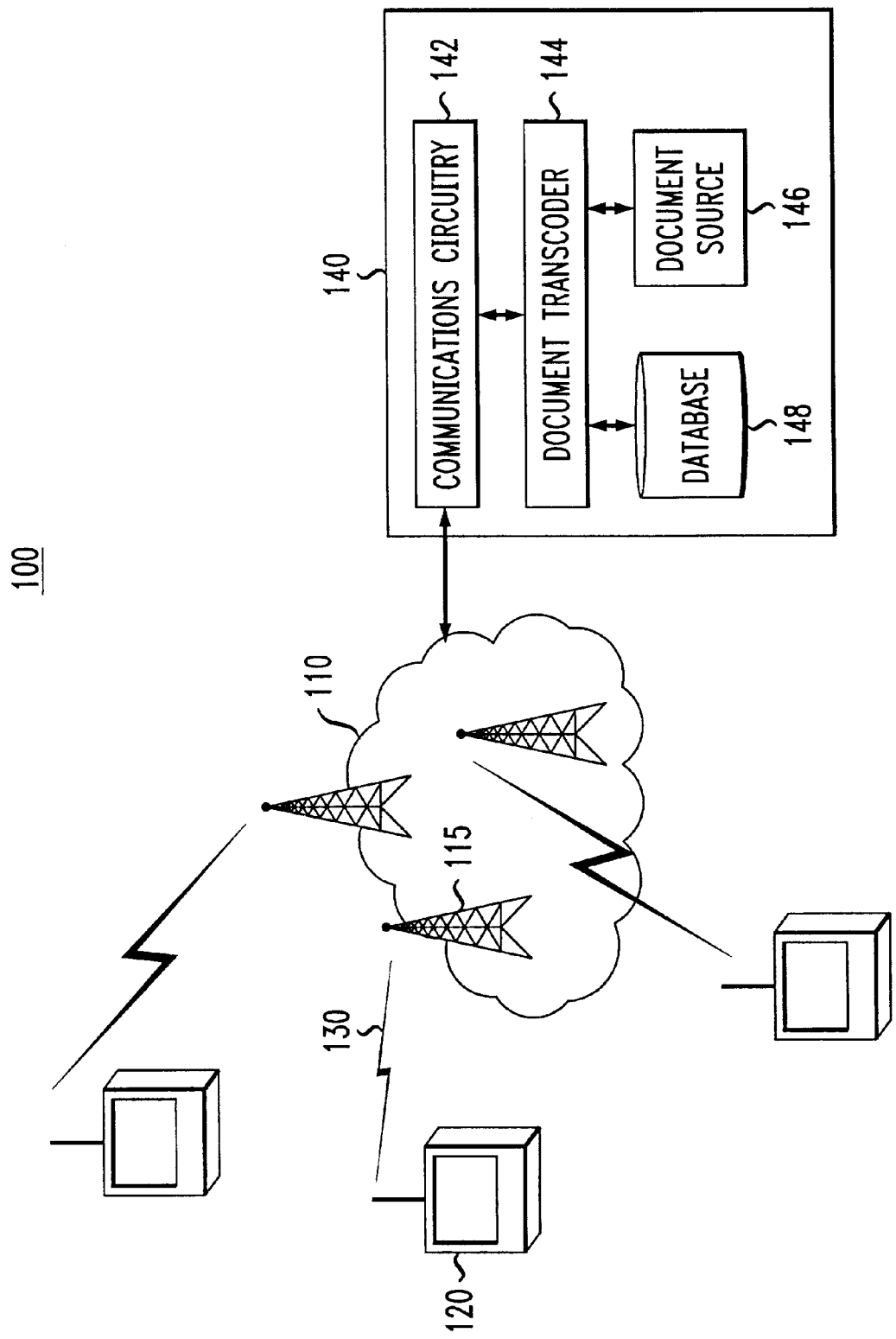
FIG. 1 illustrates an embodiment of a wireless infrastructure within which the present invention can operate.

Referring initially to FIG. 1, illustrated is an embodiment of a wireless infrastructure 100 within which the present invention can operate. The wireless infrastructure 100 includes a plurality of mobile stations (one of which is designated 120) coupled to a plurality of base stations (one of which is designated 115). The mobile stations 120 are selectively coupled to the respective base stations 115 by a wireless link (one of which is designated 130). The base stations 115 make up a part of a communications network 110. The communications network 110 is coupled to a communication and transcoding system 140. The communication and transcoding system 140 includes a station identifying circuit 142, a transcoding circuit 144, a database 148 and a document source 146.

The mobile stations 120 each include an identifier and a document display having potentially unique document display capabilities. It is not necessary, however, for the identifier to be unique to each mobile station 120. In fact, the identifier may merely be a characteristic of the mobile station 120 based upon a specific manufacturer's mobile station product. The principles of the present invention are not limited by the system in which identifiers are assigned to the mobile stations 120.

It is possible that the document display capabilities of the mobile station 120 are user-determined. For example, a mobile station 120 may have both text and graphics display capabilities but may only require text from a document that has both text and graphics. The user will select an identifier from, for example, a set of predetermined identifier codes, which will identify the mobile station 120 as only having text-only display capabilities. Additionally, the determination of the mobile station 120 identifier may be accomplished by the communication and transcoding system 140 polling the mobile stations 120 for the respective display capabilities thereof. If the mobile station 120 is a portable personal computer ("PC"), for instance, the PC may not generate an identifier when it requests a document. To determine the display capabilities of the PC, the communication and transcoding system 140 may independently query the PC and the station identifying circuit 142 will access and read a file resident in the PC describing the display capabilities of the PC. Those skilled in the art should be familiar with polling systems, in general, and more specifically with systems that are capable of determining the capabilities of a polled device.

A document request is, typically, initiated at a mobile station 120. Again, the mobile stations 120 have varying degrees of display capabilities and the document requested may take any form (e.g., an e-mail text-only message from a message service center or a file, including real-time video, resident in another mobile station 120). The document request along with the identifier of the mobile station 120 are transmitted using one of the wireless links 130 to one of the base stations 115. The base station 115 processes the document request to the communication and transcoding system 140. When a document request is received by the communication and transcoding system 140, the station identifying circuit 142 detects the identifier of the mobile station 120 that transmitted the document request. If the mobile station 120 identifier is not present, the station identifying circuit 142 is enabled to poll the mobile station 120 to determine its display capabilities.

After the identifier is detected or the display capabilities identified, the transcoding circuit 144 modifies the requested document according to the display capabilities of the mobile station 120. The transcoding circuit 144 accomplishes the modification process by retrieving the requested document from a document source 146. For example, the document source 146 may be a database of documents, the world-wide-web, or as described above, another mobile station 120. After retrieval of the requested document from the document source 146, the native format of the requested document is compared to the display capabilities of the mobile station 120. If there is an identifier transmitted along with the document request from the mobile station 120, the identifier is compared to a plurality of stored identifiers residing in a database 148. The plurality of stored identifiers in the database 148 correspond to the predetermined display capabilities of the mobile station 120. Of course, a database 148 that includes the capabilities of the display is not necessary for the broad scope of the present invention.

The transcoding circuit 144 will allow the requested document to be transmitted, by the station identifying circuit 142, unmodified if it determines that the display capabilities of the mobile station 120 support the native format of the requested document. However, if the display capabilities of the mobile station 120 do not support the native format of the requested documents, the transcoding circuit 144 modifies the requested document according to the display capabilities of the mobile station 120 before the document is transmitted to the particular mobile station 120. Thus, the transcoding process generally occurs within the communication and transcoding system 140 before the document is transmitted to the mobile station 120. The present invention, however, is not limited as such and the mobile station 120 may perform a portion or all of the transcoding process locally.

A typical application for the present invention is illustrated by the following example. A user at a mobile station 120, a notebook computer that can only display JPEG-encoded documents on a monochrome screen, requests a document that is GIF-encoded and resident in the user's PC at the home office. The document request is processed through the communication and transcoding system 140 using the communications network 110 and wireless link 130. The station identifying circuit 142 is activated to determine the display capabilities of the requesting mobile station 120, the notebook computer. Assuming the notebook computer did not transmit an identifier along with the document request, the station identifying circuit 142 polls the notebook computer to identify the display capabilities thereof. The display information and the document request are provided to the transcoding circuit 144.

The transcoding circuit 144 retrieves the requested document from the user's home office PC assuming that the communications network 110 has the capability and permission to remotely access the user's home office PC. After retrieving the requested document, the transcoding circuit 144 notes the format of the requested document. The display capabilities of the notebook computer are compared to the format of the requested document and the incompatibilities are identified (in this case, the monochrome screen of the notebook computer and the document encoding scheme).

The transcoding circuit 144 transcodes the GIF-encoded document into a JPEG-encoded document. The transcoding circuit 144 compensates for the monochrome screen by removing the color components from the requested document. After the requested document has been transcoded into the new format, the document is transmitted by the station identifying circuit 142 through the communications network 110 to the mobile station 120.

In other applications of the present invention, the transcoding circuit 144 may transcode a graphics-based formatted document into a text-based format for display at a mobile station 120 that has text-only display capabilities. Also, the transcoding circuit 144 may remove embedded graphical images and sounds from a document prior to transmitting the document to a mobile station 120 with text-only display capabilities.

The above-described transcoding process is to be distinguished from document display modifications based on user preferences. The prior art provides suppression of document attributes based on the user's preferences. For example, Netscape Communication Corporation's Internet software provides a function that allows a user to suppress images on documents retrieved on the world-wide-web. Again, the present invention transcodes documents based on the display capabilities of the mobile station 120. The display capabilities of the mobile station 120, as previously described above, can be user-determined, identified by polling the mobile station 120 or the like.

The present invention realizes savings in reducing the amount of data transferred to the mobile stations 120. For example, a VGA SA graphics display system in display mode has a resolution of about 320 by 200 pixels with 256 colors. The 256 colors can be represented by 8 bits (i.e., one byte). A monochrome display screen, on the other hand, only requires 1 bit to represent the colors supported (i.e., ON or OFF). Therefore, when a document is transcoded to a mobile station 120 that only has a monochrome screen display capability, the transcoding circuit 144 strips off 7 of the 8 bits representing the colors. As a result, about an 87.5% reduction of color information is transmitted to the mobile station 120.

Analogous data transmission reductions can also be illustrated when a mobile station 120 with lower resolution characteristics (e.g., a pager with a display resolution of about 80 by 25 pixels of text-only information) requests a document. Suppose that the document requested is an image on the screen of a PC with a resolution of about 720 by 400 pixels VGA in text mode. For this degree of resolution, the data displayed on the screen is about 288,000 data points (720*400), assuming each pixel represents a data point. The pager's screen can only display about 2000 data points (80*25). The transcoding circuit 144 detects that the pager's screen cannot fully display the entire image and transcodes the document to accommodate the pager's screen resolution. By not transmitting the entire screen, about a 99.3% reduction in transmitted data is realized. If the PC resolution is about 200 with 256 colors VGA in graphics mode, the data transmission reduction is about 96.9%.

Figure 2:
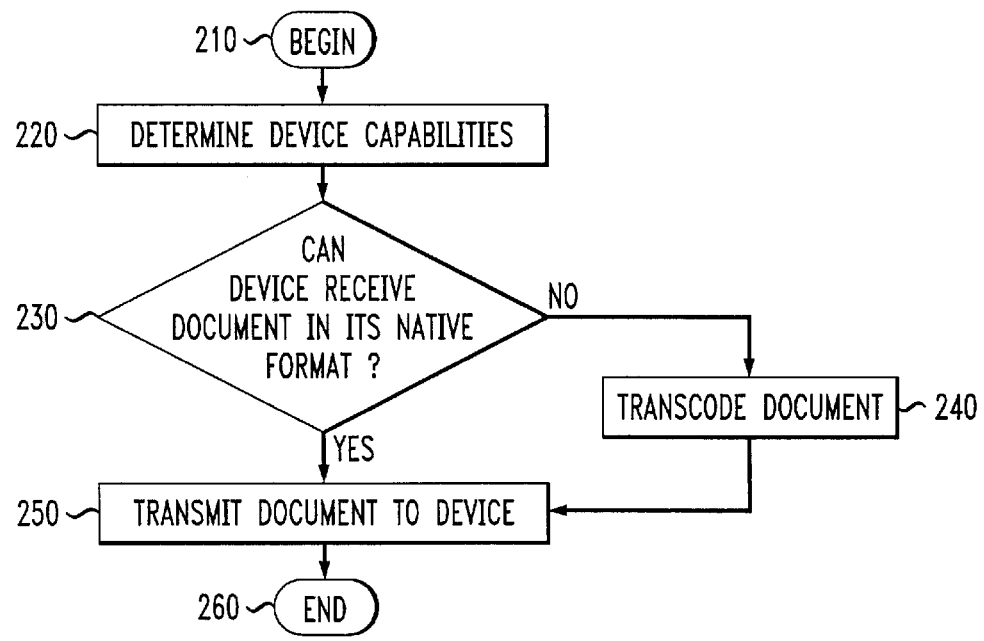
FIG. 2 illustrates a flow diagram of an embodiment of a method of document transcoding according to the principles of the present invention.

Turning now to FIG. 2, illustrated is a flow diagram of an embodiment of a method of document transcoding according to the principles of the present invention. The method begins at a begin step 210 wherein a communication and transcoding system waits for an incoming document request. Upon receiving a document request from a transmitting mobile station, a station identifying circuit determines the document display capabilities of the mobile station during a determine device capabilities step 220. At a decisional step 230, a transcoding circuit compares the display capabilities of the receiving mobile station with the native format of the requested document. If the receiving mobile station is able to receive the requested document without transcoding, the station identifying circuit facilitates transmission of the document to the receiving mobile station during a transmit document to device step 250. Alternatively, if the display capabilities of the receiving mobile station do not support the document in its native format, the transcoding circuit transcodes the document in accordance with the display capabilities thereof during a transcode document step 240. After transcoding the document, the document is transmitted by the station identifying circuit to the receiving mobile station in its transcoded form during the transmit document to device step 250. The method terminates at an end step 260.

Figure 3:
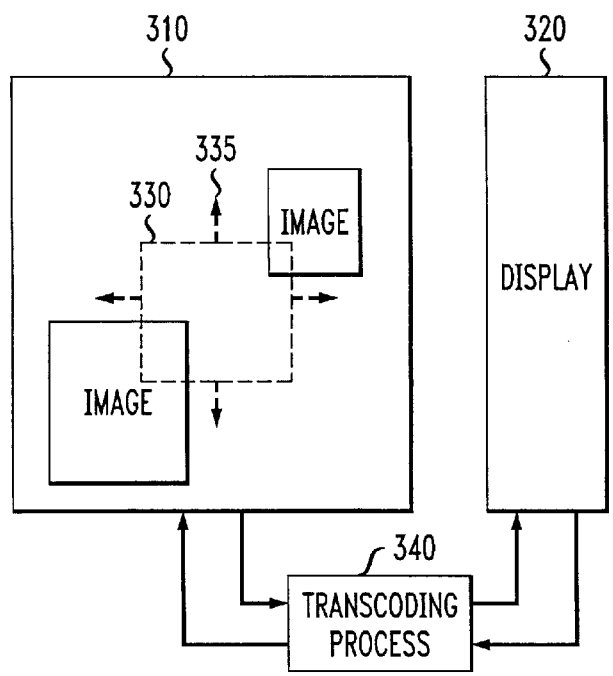
FIG. 3 illustrates an exemplary transcoding operation whereby the user selects the portion of the document that will be displayed.

Turning now to FIG. 3, illustrated is an exemplary transcoding operation whereby the user of a mobile station, with limited resolution display capability, selects the portion of the document that will be displayed. A document page 310 is illustrated having an image 330 that spans any one of a plurality of directions indicated by a plurality of arrows (one of which is designated as 335). A display 320 of the mobile station (having similar dimensions as the image 330) is coupled to a transcoding system 340. The system generally operates as follows. Analogous to the method described with respect to FIG. 2, the user transmits a document request from a mobile station and the document is retrieved from a document source. For illustrative purposes, the document page cannot be displayed on the mobile station display 320 in its entirety. Following the operation of the transcoding system 340, the document is re-formatted to accommodate the display 320 of the mobile station. Since the mobile station display 320 cannot display the document page 310 in its entirety, the present invention allows the user to span the document page 310 in one of the plurality of directions indicated by the arrows 335. The user controls the direction that the image 330 travels within the document page 310 with a direction movement device (not shown) The direction movement device, for example, may be a cursor direction key on a computer keyboard or a thumb-wheel. Joysticks and computer mouses are other known devices that can provide directional control. Those skilled in the art should be aware of other directional control methodologies employing hardware or software solutions. As a result, the data enclosed by the image 330 will be mirrored in the display 320 of the station.

The previously described communications infrastructure, communication and transcoding systems and methods of the present invention are submitted for illustrative purposes only of course, other systems and methods capable of transcoding a document to be transmitted to a mobile station according to document display capabilities thereof and other communication infrastructures are well within the broad scope of the present invention. For a better understanding of communication systems see *The Irwin Handbook of Telecommunications*, 2nd edition, by James Harry Green, Irwin Professional Publishing (1992); *Voice & Data Communications Handbook*, by Bud Bates and Donald Gregory, McGraw-Hill Companies (1996); *Data Design Network*, Darren L. Spohn, McGraw-Hill Companies (1993). The aforementioned references are herein incorporated by reference.

Although the present invention and its advantages have been described in detail, those skilled in the art should understand that they can make various changes, substitutions and alterations herein without departing from the spirit and scope of the invention in its broadest form.

What is claimed is:

1. A system for transcoding a document to be transmitted to a mobile station of a user according to document display capabilities thereof, said system comprising:

a station identifying circuit that receives, without intervention from said user, said document display capabilities directly from said mobile station; and a transcoding circuit that modifies said document as a function of said document display capabilities and rearranges a temporal order of transmission of said document before said document is transmitted to said particular mobile station, whereby said particular mobile station is freed from having locally to substantially modify said document according to said document display capabilities, wherein said rearranging of said temporal order of transmission includes rearranging based on related elements of said document.

2. The system as recited in claim 1 wherein said transcoding circuit performs one selected from the group consisting of:

translating said document from a first display format to a second display format, only when said document display capabilities include a capability of displaying said document in said second display format;

translating said document from a graphics-based format to a text-based format, only when said document display capabilities include only a capability of displaying said text-based format; and modifying an attribute of said document.

3. The system as recited in claim 1 wherein said transcoding circuit modifies said document requested by said mobile station.

4. The system as recited in claim 1 further comprising a user capability that defines a subset of said document display capabilities.

5. A system for transcoding a document to be transmitted to a mobile station of a user according to document display capabilities thereof, said system comprising:

a station identifying circuit that receives, without intervention from said user, said document display capabilities directly from said mobile station; and a transcoding circuit that modifies said document as a function of said document display capabilities and divides said document into pages before said document is transmitted to said particular mobile station, whereby said particular mobile station requests at least one of said pages to be transmitted and is freed from having locally to substantially modify said document according to said document display capabilities.

6. The system as recited in claim 5 wherein said transcoding circuit performs one selected from the group consisting of:

translating said document from a first display format to a second display format, only when said document display capabilities include a capability of displaying said document in said second display format;

translating said document from a graphics-based format to a text-based format, only when said document display capabilities include only a capability of displaying said text-based format; and modifying an attribute of said document.

7. The system as recited in claim 5 wherein said transcoding circuit modifies said document requested by said mobile station.

8. The system as recited in claim 5 further comprising a user capability that defines a subset of said document display capabilities.

9. A system for transcoding a document containing control codes to be transmitted to a mobile station of a user according to document display capabilities thereof, said system comprising:

a station identifying circuit that receives, without intervention from said user, said document display capabilities directly from said mobile station; and a transcoding circuit that modifies said document as a function of said document display capabilities and said control codes before said document is transmitted to said particular mobile station, whereby said particular mobile station is freed from having locally to substantially modify said document according to said document display capabilities, wherein said control codes define types of modifications to be performed on said document.

10. The system as recited in claim 9 wherein said transcoding circuit performs one selected from the group consisting of:

translating said document from a first display format to a second display format, only when said document display capabilities include a capability of displaying said document in said second display format;

translating said document from a graphics-based format to a text-based format, only when said document display capabilities include only a capability of displaying said text-based format; and modifying an attribute of said document.

11. The system as recited in claim 9 wherein said transcoding circuit modifies said document requested by said mobile station.

12. The system as recited in claim 9 further comprising a user capability that defines a subset of said document display capabilities.

13. A method of transcoding a document to be transmitted to a mobile station of a user according to document display capabilities thereof, said method comprising:

receiving, without intervention from said user, said document display capabilities directly from said mobile station;

modifying said document as a function of said document display capabilities before said document is transmitted to said particular mobile station thereby yielding a modified document; and rearranging a temporal order of transmission of said modified document before said document is transmitted to said particular mobile station, whereby said particular mobile station is freed from having locally to substantially modify said document according to said document display capabilities, wherein said rearranging of said temporal order of transmission includes rearranging based on related elements of said document.

14. The method as recited in claim 13 wherein said step of modifying further comprises one step selected from the group consisting of:

translating said document from a first display format to a second display format, only when said document display capabilities include a capability of displaying said document in said second display format;

translating said document from a graphics-based format to a text-based format, only when said document display capabilities include only a capability of displaying said text-based format; and modifying an attribute of said document.

15. The method as recited in claim 13 wherein said steps of receiving and modifying are performed by executing a sequence of software instructions in a computer system associated with a base station.

16. The method as recited in claim 13 wherein said step of modifying said document requested by said mobile station.

17. The method as recited in claim 13 further comprising defining a subset of said document display capabilities.

18. A method of transcoding a document to be transmitted to a mobile station of a user according to document display capabilities thereof, said method comprising:

receiving, without intervention from said user, said document display capabilities directly from said mobile station; and modifying said document as a function of said document display capabilities by dividing said document into pages corresponding in size to said display before said document is transmitted to said particular mobile station, whereby said particular mobile station requests: at least one of said pages to be transmitted and is freed from having locally to substantially modify said document according to said document display capabilities.

19. The method as recited in claim 18 wherein said step of modifying further comprises one step selected from the group consisting of:
translating said document from a first display format to a second display format, only when said document display capabilities include a capability of displaying said document in said second display format;
translating said document from a graphics-based format to a text-based format, only when said document display capabilities include only a capability of displaying said text-based format; and
modifying an attribute of said document.

20. The method as recited in claim 18 wherein said steps of receiving and modifying are performed by executing a sequence of software instructions in a computer system associated with a base station.

21. The method as recited in claim 18 wherein said step of modifying said document requested by said mobile station.

22. The method as recited in claim 18 further comprising defining a subset of said document display capabilities.

23. A method of transcoding a document containing control codes to be transmitted to a mobile station of a user according to document display capabilities thereof, said method comprising:
receiving, without intervention from said user, said document display capabilities directly from said mobile station; and
modifying said document as a function of said document display capabilities and said control codes before said document is transmitted to said particular mobile station, whereby said particular mobile station is freed from having locally to substantially modify said document according to said document display capabilities, wherein said control codes define types of modifications to be performed on said document.

24. The method as recited in claim 23 wherein said step of modifying further comprises one step selected from the group consisting of:
translating said document from a first display format to a second display format, only when said document display capabilities include a capability of displaying said document in said second display format;
translating said document from a graphics-based format to a text-based format, only when said document display capabilities include only a capability of displaying said text-based format; and
modifying an attribute of said document.

25. The method as recited in claim 23 wherein said steps of receiving and modifying are performed by executing a sequence of software instructions in a computer system associated with a base station.

26. The method as recited in claim 23 wherein said step of modifying said document requested by said mobile station.

27. The method as recited in claim 23 further comprising defining a subset of said document display capabilities.

28. A wireless infrastructure, comprising:
a plurality of mobile stations each associated with a user and having a document display, each said document display has varying document display capabilities;
a plurality of base stations, intercoupled together and selectively couplable to said plurality of mobile stations to allow communication of documents thereamong, each of said base stations including a system that transcodes documents to be transmitted to mobile stations coupled thereto in response to said varying document display capabilities thereof, said system including:
a station identifying circuit that receives, without intervention from said user, said varying document display capabilities directly from said plurality of mobile stations; and
a transcoding circuit that modifies said documents as a function of said document display capabilities and rearranges a temporal order of transmission of said document before said documents are transmitted to said mobile stations, whereby said mobile stations are freed from having locally to substantially modify said documents, wherein said rearranging of said temporal order of transmission includes rearranging based on related elements of said document.

29. The infrastructure recited in claim 28 wherein said transcoding circuit performs one selected from the group consisting of:
translating said document from a first display format to a second display format, only when said document display capabilities include a capability of displaying said document in said second display format;
translating said document from a graphics-based format to a text-based format, only when said document display capabilities include only a capability of displaying said text-based format; and
modifying an attribute of said document.

30. The infrastructure as recited in claim 28 wherein said transcoding circuit modifies said document requested by said plurality of mobile stations.

31. The infrastructure as recited in claim 28 further comprising a user capability that defines a subset of said document display capabilities.

32. A wireless infrastructure, comprising,
a plurality of mobile stations each associated with a user and having a document display, each said document display has varying document display capabilities;
a plurality of base stations, intercoupled together and selectively couplable to said plurality of mobile stations to allow communication of documents thereamong, each of said base stations including a system that transcodes documents to be transmitted to mobile stations coupled thereto in response to said varying document display capabilities thereof, said system including:
a station identifying circuit that receives, without intervention from said user, said varying document display capabilities directly from said plurality of mobile stations; and
a transcoding circuit that modifies said documents as a function of said document display capabilities and divides said documents into pages before said documents are transmitted to said mobile stations, whereby said mobile stations request at least one of said pages to be transmitted and are freed from having locally to substantially modify said documents.

33. The infrastructure recited in claim 32 wherein said transcoding circuit performs one selected from the group consisting of:
translating said document from a first display format to a second display format, only when said document display capabilities include a capability of displaying said document in said second display format;

translating said document from a graphics-based format to a text-based format, only when said document display capabilities include only a capability of displaying said text-based format; and modifying an attribute of said document.

34. The infrastructure as recited in claim 32 wherein said transcoding circuit modifies said document requested by said plurality of mobile stations.

35. The infrastructure as recited in claim 32 further comprising a user capability that defines a subset of said document display capabilities.

36. A wireless infrastructure, comprising:

a plurality of mobile stations each associated with a user and having a document display, each said document display has varying document display capabilities;

a plurality of base stations, intercoupled together and selectively couplable to said plurality of mobile stations to allow communication of documents thereamong, each of said base stations including a system that transcodes documents containing control codes to be transmitted to mobile stations coupled thereto in response to said varying document display capabilities thereof, said system including:

a station identifying circuit that receives, without intervention from said user, said varying document display capabilities directly from said plurality of mobile stations; and a transcoding circuit that modifies said documents as a function of said document display capabilities and said control codes before said documents are transmitted to said mobile stations, whereby said mobile stations are freed from having locally to substantially modify said documents, wherein said control codes define types of modifications to be performed on said document.

37. The infrastructure recited in claim 36 wherein said transcoding circuit performs one selected from the group consisting of:

translating said document from a first display format to a second display format, only when said document display capabilities include a capability of displaying said document in said second display format;

translating said document from a graphics-based format to a text-based format, only when said document display capabilities include only a capability of displaying said text-based format; and modifying an attribute of said document.

38. The infrastructure as recited in claim 36 wherein said transcoding circuit modifies said document requested by said plurality of mobile stations.

39. The infrastructure as recited in claim 36 further comprising a user capability that defines a subset of said document display capabilities.

* * * * *